United States Patent
Army et al.

(10) Patent No.: US 12,006,046 B2
(45) Date of Patent: Jun. 11, 2024

(54) ELECTRO-PNEUMATIC POWERED ENVIRONMENTAL CONTROL SYSTEM

(71) Applicant: Hamilton Sundstrand Corporation, Charlotte, NC (US)

(72) Inventors: Donald E. Army, Enfield, CT (US); Tony Ho, Glastonbury, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 297 days.

(21) Appl. No.: 17/203,281

(22) Filed: Mar. 16, 2021

(65) Prior Publication Data

US 2021/0291991 A1 Sep. 23, 2021

Related U.S. Application Data

(60) Provisional application No. 62/990,645, filed on Mar. 17, 2020.

(51) Int. Cl.
*B64D 13/02* (2006.01)
*B64D 13/08* (2006.01)
B64D 13/06 (2006.01)

(52) U.S. Cl.
CPC ............ *B64D 13/08* (2013.01); *B64D 13/02* (2013.01); *B64D 2013/0611* (2013.01); *B64D 2013/0618* (2013.01)

(58) Field of Classification Search
CPC ............ B64D 13/06; B64D 2013/0603; B64D 2013/0611; B64D 13/02; B64D 2013/0618; B64D 2013/0644; B64D 2013/0648; B64D 13/08
USPC .................................. 454/71–74, 76
See application file for complete search history.

(56) References Cited

U.S. PATENT DOCUMENTS

| | | | |
|---|---|---|---|
| 4,523,517 A | 6/1985 | Cronin | |
| 5,442,905 A * | 8/1995 | Claeys | B64D 41/00 60/785 |
| 6,427,471 B1 | 8/2002 | Ando et al. | |
| 7,322,202 B2 | 1/2008 | Zywiak et al. | |
| 9,669,936 B1 * | 6/2017 | Fiterman | B64D 13/06 |
| 9,840,333 B2 | 12/2017 | Bruno et al. | |
| 10,035,602 B2 | 7/2018 | Bruno et al. | |
| 10,253,687 B2 * | 4/2019 | Jones | F02B 53/14 |
| 10,501,191 B1 * | 12/2019 | Dooley | B64D 13/06 |
| 2008/0139099 A1 * | 6/2008 | Baldauf | F04D 29/701 454/71 |
| 2010/0323601 A1 * | 12/2010 | Cremers | B64D 13/06 454/76 |
| 2016/0201983 A1 * | 7/2016 | Sharma | F25J 1/0204 95/47 |
| 2017/0037774 A1 * | 2/2017 | Jones | B64D 41/00 |
| 2017/0160180 A1 * | 6/2017 | Bezold | G01N 15/0656 |
| 2017/0305559 A1 * | 10/2017 | Bruno | F04D 29/284 |
| 2017/0341766 A1 * | 11/2017 | Bruno | F04D 25/045 |
| 2018/0065752 A1 * | 3/2018 | Franco | B64D 13/06 |
| 2018/0141665 A1 * | 5/2018 | Bezold | F02C 6/08 |
| 2018/0163627 A1 | 6/2018 | Suciu et al. | |
| 2018/0194481 A1 | 7/2018 | Ludvik et al. | |

FOREIGN PATENT DOCUMENTS

| | | |
|---|---|---|
| EP | 3176089 A1 | 6/2017 |
| EP | 3323728 A1 | 5/2018 |
| WO | 2009007094 A2 | 1/2009 |

OTHER PUBLICATIONS

Extended European Search Report; European Application No. 21160949.0-1010; dated Aug. 10, 2021; 9 pages.
European Office Action for European Application No. 21160949.0-1010; dated Apr. 26, 2023; 6 pages.

* cited by examiner

*Primary Examiner* — Ko-Wei Lin
(74) *Attorney, Agent, or Firm* — CANTOR COLBURN LLP

(57) ABSTRACT

A medium supply system for delivering one or more mediums to an environmental control system of a vehicle includes a manifold arranged in fluid communication with an inlet of the environmental control system, a first medium source for delivering a first medium to the manifold via a first port; a second medium source for delivering a second medium to the manifold via a second port, and a third medium source for delivering a third medium to the manifold via a third port. At least one of a temperature and pressure of each of the first medium, the second medium, and the third medium varies.

13 Claims, 1 Drawing Sheet

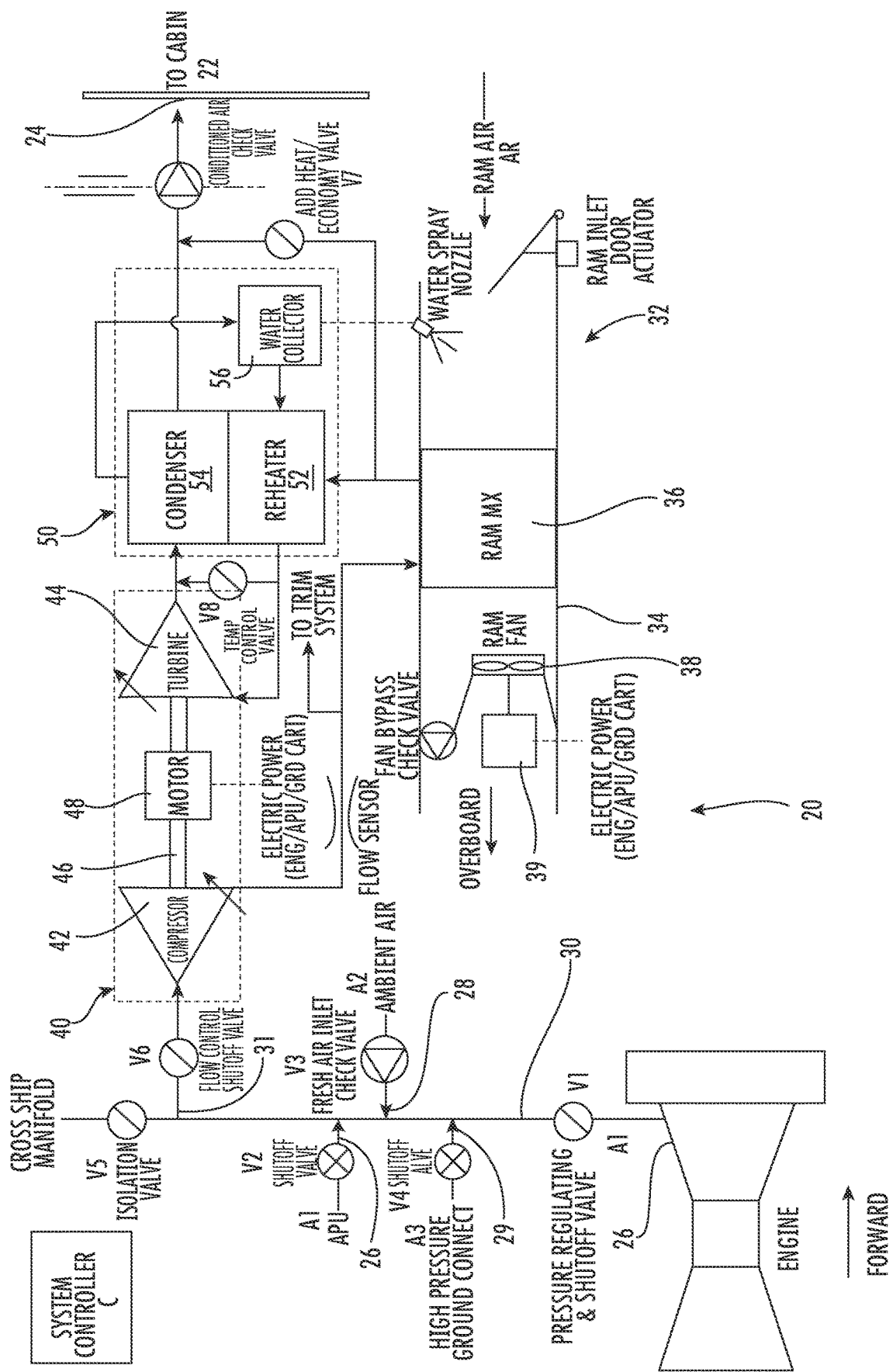

ELECTRO-PNEUMATIC POWERED ENVIRONMENTAL CONTROL SYSTEM

CROSS-REFERENCE TO RELATED APPLICATIONS

This application claims the benefit of U.S. Provisional Application 62/990,645 filed Mar. 17, 2020, the disclosure of which is incorporated herein by reference in its entirety.

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards smaller systems with higher efficiency. One approach to improve efficiency of an aircraft environmental control system is to eliminate the bleed air entirely and use electrical power to compress outside air to the minimum pressure required for the Environmental Control System (ECS) thus minimizing energy lost to valves regulating engine bleed air. A second approach is to use lower engine pressure and then boost it to the minimum required by the ECS. The third approach is to use the energy in the cabin outflow air to compress outside air and bring it into the cabin and thus use less engine bleed air. Each of these approaches alone provides limited efficiency with respect to engine fuel burn.

BRIEF DESCRIPTION

According to one or more embodiments, a medium supply system for delivering one or more mediums to an environmental control system of a vehicle includes a manifold arranged in fluid communication with an inlet of the environmental control system, a first medium source for delivering a first medium to the manifold via a first port; a second medium source for delivering a second medium to the manifold via a second port, and a third medium source for delivering a third medium to the manifold via a third port. At least one of a temperature and pressure of each of the first medium, the second medium, and the third medium varies.

In addition to one or more of the features described above, or as an alternative, in further embodiments the first medium source is one of an engine and an auxiliary power unit, and the first medium is bleed air.

In addition to one or more of the features described above, or as an alternative, in further embodiments the second medium source is an atmosphere surrounding the vehicle, and the second medium is fresh air.

In addition to one or more of the features described above, or as an alternative, in further embodiments the third medium source is a ground supply.

According to another embodiment, an environmental control system has an environmental control system pack including a compression device including a compressor, a pneumatically driven energy source, and an electrically driven energy source. A ram air circuit includes a ram air shell having at least one heat exchanger positioned therein, and a dehumidification system is arranged in fluid communication with the ram air circuit. A medium supply system includes a conduit arranged in fluid communication with a first medium source, a second medium source, and a third medium source, such that one or more of a first medium, a second medium, and a third medium is provided to an inlet of the environmental control system pack via the conduit.

In addition to one or more of the features described above, or as an alternative, in further embodiments the environmental control system pack is operable in a plurality of modes and at least one of the pneumatically driven energy source and the electrically driven energy source is selected in response to a selected mode.

In addition to one or more of the features described above, or as an alternative, in further embodiments in a first mode of the plurality of modes, the compressor is driven by both the pneumatically driven energy source and the electrically driven energy source.

In addition to one or more of the features described above, or as an alternative, in further embodiments in a first mode of the plurality of modes, the compressor is driven by only the electrically driven energy source.

In addition to one or more of the features described above, or as an alternative, in further embodiments the one or more of the first medium, the second medium, and the third medium provided to the inlet of the environmental control system pack is selected in response to the selected mode.

In addition to one or more of the features described above, or as an alternative, in further embodiments the compressor has a variable diffuser.

In addition to one or more of the features described above, or as an alternative, in further embodiments the electrically driven energy source is a variable speed motor.

In addition to one or more of the features described above, or as an alternative, in further embodiments the pneumatically driven energy source includes a turbine having a plurality of nozzle configurations.

In addition to one or more of the features described above, or as an alternative, in further embodiments the one or more of the first medium, the second medium, and the third medium selected has a lowest possible temperature and/or pressure suitable to meet a demands of a load arranged in fluid communication with an outlet of the environmental control system pack.

In addition to one or more of the features described above, or as an alternative, in further embodiments a pressure ratio at the compressor is at least 2:1.

In addition to one or more of the features described above, or as an alternative, in further embodiments the ram air circuit includes an electrically driven fan for moving an air flow across the at least one heat exchanger.

In addition to one or more of the features described above, or as an alternative, in further embodiments the ram air circuit includes fan for moving an air flow across the at least one heat exchanger, wherein the fan is operably coupled to a shaft of the compression device.

According to another embodiment, a method of operating an environmental control system includes determining a demand of one or more loads in fluid communication with the environmental control system, identifying at least one source for providing a medium to an inlet of the environmental control system, the medium having a lowest possible temperature and/or pressure to meet the demand of the one or more loads, and operating one or more ports of a medium supply system to deliver the identified medium to the inlet.

In addition to one or more of the features described above, or as an alternative, in further embodiments comprising determining whether to drive a compressor of the environmental control system via a pneumatically driven energy source or an electrically driven energy source.

In addition to one or more of the features described above, or as an alternative, in further embodiments determining the demand of one or more loads in fluid communication with the environmental control system includes determining a flight condition of the vehicle.

In addition to one or more of the features described above, or as an alternative, in further embodiments comprising selecting a mode of operation of the environmental control system in response to the flight condition of the vehicle.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWING

The following descriptions should not be considered limiting in any way. With reference to the accompanying FIGURE, like elements are numbered alike:

The FIGURE is a simplified schematic diagram of a system according to an embodiment.

DETAILED DESCRIPTION

A detailed description of one or more embodiments of the disclosed apparatus and method are presented herein by way of exemplification and not limitation with reference to the FIGURE.

Embodiments herein provide an environmental control system of an aircraft that mixes mediums from different sources and uses energy from one or more of the different sources to power the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

With reference now to the FIGURE, a schematic diagram of a portion of an environment control system (ECS) 20, such as a pack for example, is depicted according to non-limiting embodiments. Although the environmental control system 20 is described with reference to an aircraft, alternative applications are also within the scope of the disclosure. As shown in the FIGURE, the system 20 can receive one or more mediums and provide a conditioned form of the one or more mediums to one or more loads 22 via an outlet 24. In embodiments where the environmental control system 20 is used in an aircraft application, a first medium A1 that may be provided to the ECS 20 via at least one first port 26 is bleed air, which is pressurized air originating from i.e. being "bled" from a first medium source, such as an engine or auxiliary power unit (APU) of the aircraft. As is known, an auxiliary power unit may be any type of device used to provide energy for any function of the aircraft besides propulsion. It shall be understood that one or more of the temperature, humidity, and pressure of the bleed air can vary based upon the compressor stage and revolutions per minute of the engine or auxiliary power unit from which the air is drawn.

Alternatively, or in addition, a second medium A2 may be provided to the ECS 20 from a second medium source via a second port 28. The second medium A2 may include fresh air, such as outside air for example. The outside air can be procured via one or more scooping mechanisms, such as an impact scoop or a flush scoop for example. Generally, the fresh air A2 described herein is at an ambient pressure equal to an air pressure outside of the aircraft when the aircraft is on the ground, and is between an ambient pressure and a cabin pressure when the aircraft is in flight. Further, a third medium A3 may be provided to the ECS from a third medium source when the aircraft is on the ground, such as air from a source external to the aircraft for example. In certain embodiments, a ground supply or cart can be used to supply heated or conditioned air flow to the aircraft via a third port 29. In an embodiment, each of the ports 26, 28, 29 is arranged in fluid communication with a manifold or conduit 30 operable to deliver the one or more mediums to a pack of the ECS 20, or to multiple packs of the ECS 20. In an embodiment, the plurality of ports 26, 28, 29, associated valves V1-V4, and the manifold 30, in combination, may be considered a medium supply system, similar to a bleed air system, arranged upstream from an inlet 31 of the ECS 20.

The environmental control system 20 includes one or more ram air circuits 32 including a shell or duct, illustrated schematically at 34, within which one or more heat exchangers are located. The shell 34 can receive and direct a medium, such as ram air AR for example, through a portion of the system 20. The one or more heat exchangers 36 arranged within the shell 34 may be referred to as ram heat exchangers and are built for efficient heat transfer from one medium to another. Within the one or more heat exchangers 36, ram air AR, such as outside air for example, acts as a heat sink to cool a medium passing there through. Examples of the type of heat exchangers that may be used, include, but are not limited to, double pipe, shell and tube, plate, plate and shell, adiabatic shell, plate fin, pillow plate, and fluid heat exchangers. As shown, a fan 38 is disposed within the ram air shell 34. The fan 38 is operable to force via push or pull methods a medium (e.g., ram air) through the shell 34 across the one or more ram heat exchangers 36. In the illustrated, non-limiting embodiment, the fan 38 is arranged downstream from the one or more ram heat exchangers 36 and is operable to pull ram air through the ram air duct shell 34 to avoid adding heat from the fan into the ram air circuit 32.

The system 20 additionally includes a compression device 40. The compression device 40 is a mechanical device that includes components for performing thermodynamic work on a medium (e.g., extracts work from or applies work to the first medium A1, the second medium A2, or the third medium A3 by raising and/or lowering pressure and by raising and/or lowering temperature). Examples of the compression device 40 include a two-wheel air cycle machine, a three-wheel air cycle machine, a four-wheel air cycle machine, etc.

As shown, the compression device 40 includes a compressor 42 and a pneumatically driven energy source, such as a turbine 44 operably coupled to each other via a shaft 46. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the first medium. The turbine 44 is a mechanical device that expands a medium and extracts work therefrom (also referred to as extracting energy).

Further, the compressor 42 may, but need not, include one or more of a compressor with high rotor backsweep, shroud bleed, and a low solidity diffuser; a variable vaned diffuser, and a mixed flow compressor. Inclusion of a variable diffuser provides peak compressor efficiency over an operating range of the compressor 42. However, it should be understood that any suitable configuration of a compressor is within the scope of the disclosure.

In an embodiment, the turbine 44 may comprise a nozzle configured to accelerate a medium supplied thereto for entry into a turbine impeller (not shown). In the compression device 40, the turbine 44 is configured to drive the compressor 42 via the shaft 46. The one or more mediums may enter the turbine 44 via a nozzle. In an embodiment, the turbine 44 has a multiple nozzle configuration that enables a varying nozzle area based on conditions surrounding the aircraft without the added complication of a variable area turbine. Alternatively, or in addition, the turbine 44 may include a plurality of nozzles, such as two nozzles for example, having varying configurations or diameters, each of which may receive a specific medium. Further, embodiments where the turbine 44 has only a single nozzle or no nozzle are also within the scope of the disclosure.

In the illustrated, non-limiting embodiment, in addition to the compressor 42 and the turbine 44, the compression device 40 additionally includes an electrically driven energy source, such as motor 48 for example, operably coupled to the compressor 42 via the shaft 46. The motor 48 may be a single speed, or alternatively, may be a variable speed motor. In such embodiments, the compressor 42 receives one or more of the first medium A1, second medium A2, and third medium A3, and using power provided from one or both of the motor 48 and turbine 44 compresses the medium. Further, the electric power used to operate the electrically driven energy source may be provided from any of a number of sources including, but not limited to an engine, an auxiliary power unit, the ground cart, or airport utilities.

The system 20 additionally includes at least one dehumidification system 50. In the illustrated, non-limiting embodiment, the dehumidification system 50 includes a reheater 52, a condenser 54, and a water extractor 56. The reheater 52 and the condenser 54 are particular types of heat exchangers. The water extractor 56 is a mechanical device that performs a process of removing water from the medium. Together, the condenser 54, the water extractor 56, and/or the reheater 52 can be combined to form a medium pressure water separator.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For example, each of the inlets 26, 28, and 29, includes a respective valve V1-V4 operable to selectively deliver a medium to the manifold 30. In an embodiment, a valve V5 is arranged within the manifold 30 and is operable to selectively transmit the medium within the manifold 30 to a second pack (not shown) of the ECS 20. Further, a flow control valve V6 may be arranged directly downstream from the manifold 30 and upstream from the inlet of the compressor 42 to control a flow rate of the one or more mediums provided to components of the ECS 20. A controller, illustrated schematically at C, is operably coupled to each of the plurality of valves.

General operation of the ECS 20 is described herein. In operation, one or more mediums may be supplied to the manifold 30. Depending on the requirements of the one or more loads in fluid communication with the outlet 24 of the ECS 20, the first medium A1 may be pulled from one or more compressor stages of an engine or the first medium A1 may be drawn from on auxiliary power unit, the second medium A2 may be pulled from the atmosphere outside the aircraft, and/or the third medium A3 may be delivered from a ground connect removably coupled to the aircraft. From the manifold 30, the medium or mixture of mediums is provided to an inlet of the compressor. Although not shown in the FIGURE, in an embodiment, one or more heat exchangers may be arranged upstream from the compressor 42, for example to cool the medium or mixed medium. Within the compressor 42, the medium or mixed medium is compressed causing the temperature and the pressure of the medium or mixed medium to increase. The heated, pressurized medium or mixed medium output from the compressor 42 is then provided to at least one ram heat exchanger 36. As shown, the fan 38 is used to move air, such as ram air AR for example, through the ram air heat exchanger 36. In the illustrated, non-limiting embodiment, the fan 38 is a tip turbine fan driven by a motor 39. The motor 39 may be operable at a single speed, or alternatively, at variable speeds. By using an electrically driven fan 38, the fan 38 may be optimized to minimize resulting ramp noise. However, in other embodiments, the fan 38 may be part of one of the compression devices 40, such as operably coupled to the compressor 42 and turbine 44 via the shaft 46 for example.

The medium or mixed medium output from the ram air heat exchanger 36 is typically provided to the dehumidification system 50. The medium or mixed medium is configured to flow through the reheater 52, the condenser 54, and the water extractor 56 sequentially. The medium or mixed medium is cooled and further cooled within the reheater 52 and the condenser 54, respectively, causing any moisture within the medium or mixed medium to condense. Moisture is then removed within the water extractor 56 and the medium or mixed medium is provided again to the reheater 52. Within this cold pass of the reheater 52, the medium or mixed medium is partially heated to produce a warm, dry medium or mixed medium. From the cold pass of the reheater 52, the warm, dry medium or mixed medium may be provided to an inlet of the turbine 44. The warm, dry medium or mixed medium is expanded across the turbine 44 and work is extracted therefrom. The work extracted by the turbine 44 of drives the compressor 42 via the shaft 46. The cooled, reduced pressure medium or mixed medium output from the turbine 44 is then provided to the condenser 54, where the medium or mixed medium is heated prior to being delivered to one or more loads of the aircraft, such as the volume 22 for example.

However, in embodiments where valve V8 is open, all or a portion of the medium or mixed medium output from the cold pass of the reheater 52 is configured to bypass the turbine 44. By mixing the medium output from the turbine 44 with a portion of medium that has bypassed the turbine 44, the temperature of the medium or mixed medium provided to the cold pass of condenser 54 can be increased.

Further, in embodiments where valve V7 is open, the air output from the ram air heat exchanger 36 has a temperature and pressure sufficient to meet the demands of the one or more loads, such as the cabin for example. Accordingly, all or at least a portion of the medium or mixed medium output from the ram air heat exchanger 36 is configured to bypass the remainder of the ECS 20, including the dehumidification system 50 and the turbine 44. In embodiments where all of the medium or mixed medium output from the ram air heat exchanger 36 is configured to bypass the remainder of the ECS 20, the motor 48, but not the turbine 44, is configured to drive the compressor 42.

The system 20 is operable in a plurality of modes, selectable based on a flight condition of the aircraft. For example, the system 20 is operable in a first mode when the aircraft is on the ground and in a second mode when the aircraft is in flight, such as high altitude cruise, climb, and/or descent for example.

In an embodiment, the system 20 is configured to control a position of each of the plurality of valves and select one or more of the sources of medium to optimize operation of the system 20 based on a flight condition of the aircraft. The controller C may be configured to operate one or more of the valves V1-V4 to provide a flow of one or more mediums to the ECS 20, the flow having the lowest possible temperature and/or pressure suitable to meet the demands of the one or more loads when a conditioned form of the flow is output from the ECS 20. In an embodiment, the pressure of the medium provided to the ECS 20 is selected to achieve a desired pressure ratio at the compressor 42. The pressure ratio at the compressor is the pressure of the medium output from the compressor 42 relative to the pressure of the medium provided to an inlet of the compressor 42. In an embodiment, the pressure ratio about 2:1, or alternatively, about 2.5:1, 3:1, 3.5:1, 4:1, 4.5:1, and 5:1. Further, the controller C may be operable to control the speed of the turbine 44, alternatively to or in addition to the motor speed, to increase the pressure ratio at the compressor 42.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A medium supply system for delivering one or more mediums to an environmental control system of a vehicle, the medium supply system comprising:
    a manifold having an outlet fluidly coupled to an inlet of the environmental control system;
    a first medium source for delivering a first medium to the manifold via a first port;
    a second medium source for delivering a second medium to the manifold via a second port, wherein the second medium source is an atmosphere surrounding the vehicle and the second medium is fresh air; and
    a third medium source for delivering a third medium connected to the manifold via a third port, wherein the first medium, the second medium, and the third medium are different and at least one of a temperature and pressure of each of the first medium, the second medium, and the third medium varies;
    wherein a mixture of at least two of the first medium, the second medium, and the third medium is provided at the outlet of the manifold.

2. The medium supply system of claim 1, wherein the first medium source is one of an engine and an auxiliary power unit, and the first medium is bleed air.

3. The medium supply system of claim 1, wherein the third medium source is a ground supply.

4. An environmental control system of a vehicle, the environmental control system comprising:
    an environmental control system pack including:
        an inlet;
        a compression device including a compressor, a pneumatically driven energy source, and an electrically driven energy source;
        a ram air circuit including a ram air shell having at least one heat exchanger positioned therein;
        a dehumidification system arranged in fluid communication with the ram air circuit; and
    a medium supply system including a conduit arranged in fluid communication with a source of a first medium, a source of a second medium, and a source of a third medium, the first medium, the second medium, and the third mediums being different types of mediums, wherein at least two of the first medium, the second medium, and the third medium are mixed within the conduit and provided to the inlet of the environmental control system pack, wherein the at least two mediums includes the second medium and the second medium is a fresh air having a pressure generally equal to an ambient pressure outside of the vehicle.

5. The environmental control system according to claim 4, wherein in a first mode of a plurality of modes, the compressor is driven by both the pneumatically driven energy source and the electrically driven energy source.

6. The environmental control system according to claim 5, wherein in a second mode of the plurality of modes, the compressor is driven by only the electrically driven energy source.

7. The environmental control system according to claim 5, wherein the one or more of the first medium, the second medium, and the third medium provided to the inlet of the environmental control system pack is selected in response to a selected mode of the plurality of modes.

8. The environmental control system according to claim 4, wherein the compressor has a variable diffuser.

9. The environmental control system according to claim 4, wherein the electrically driven energy source is a variable speed motor.

10. The environmental control system according to claim 4, wherein the pneumatically driven energy source includes a turbine having a plurality of nozzle configurations.

11. The environmental control system according to claim 10, wherein a pressure ratio at the compressor is at least 2:1.

12. The environmental control system according to claim 4, wherein the ram air circuit includes an electrically driven fan for moving an air flow across the at least one heat exchanger.

13. The environmental control system according to claim 4, wherein the ram air circuit includes fan for moving an air flow across the at least one heat exchanger, wherein the fan is operably coupled to a shaft of the compression device.

* * * * *